United States Patent

Conaway

Patent Number: 5,110,542
Date of Patent: May 5, 1992

[54] RAPID DENSIFICATION OF MATERIALS

[75] Inventor: Robert M. Conaway, Columbus, Ohio

[73] Assignee: Vital Force, Inc., Columbus, Ohio

[21] Appl. No.: 663,625

[22] Filed: Mar. 4, 1991

[51] Int. Cl.⁵ .................................................. B22F 1/00
[52] U.S. Cl. .......................................... 419/25; 419/39; 419/48; 419/49
[58] Field of Search ........................ 429/25, 39, 48, 49

[56] References Cited

U.S. PATENT DOCUMENTS

| | | | |
|---|---|---|---|
| 3,356,496 | 12/1967 | Hartley | 419/6 |
| 3,787,205 | 1/1974 | Church | 419/23 |
| 4,041,742 | 8/1977 | Rozmus | 419/30 |
| 4,368,074 | 1/1983 | Otto et al. | 419/51 |
| 4,389,362 | 6/1983 | Larsson | 419/8 |
| 4,414,028 | 11/1983 | Inoue | 419/31 |
| 4,431,605 | 2/1984 | Lueth | 419/26 |
| 4,539,175 | 9/1985 | Lichti et al. | 419/49 |
| 4,762,679 | 8/1988 | Gegel et al. | 419/28 |
| 4,856,311 | 8/1989 | Conaway | 419/42 |
| 4,942,750 | 7/1990 | Conaway | 419/42 |

OTHER PUBLICATIONS

"Development Activities Concerning High-Speed HIP" by Robert M. Conaway, published as an article in *Metal Powder Report*, Feb. 1988.

"Cost-Effective Isostatic Forging", by Robert M. Conaway, published as an article in *Advanced Materials & Processes*, Jun. 1989.

"Mechanical Properties of Fully Densified Injection-Molded Carbonyl Iron Powder" by S. T. Lin and R. M. German, published as an article in *Metallurgical Transactions A*, Sep. 1990.

Primary Examiner—Stephen J. Lechert, Jr.
Attorney, Agent, or Firm—George Wolken, Jr.

[57] ABSTRACT

The present invention describes a process for the compaction and densification of materials using heat and high pressure in which pressure is applied isostatically to the workpiece to be compacted, heat is applied to the pressurized workpiece as rapidly as feasible, effecting thereby full compaction and densification. Heating is terminated and the workpiece cooled while the workpiece is still pressurized. This process effects hot-isostatic-processing of workpieces while reducing the time such workpieces spend at elevated temperatures. The resulting parts can have novel structures, properties or compositions not obtained with other processing procedures.

6 Claims, 2 Drawing Sheets

RAPID DENSIFICATION OF MATERIALS

BACKGROUND OF INVENTION

This invention relates generally to the field of high pressure processing of materials. More particularly, this invention relates to processes for compaction and consolidation of materials using isostatic application of high pressures in combination with application of high temperatures for short periods of time, and, further relates to novel conditions of matter formed thereby.

An important technique in modern materials science and metallurgy is the application of heat and isostatic pressure to a material in a process known as "hot isostatic pressing" or "HIP". HIP is a very versatile tool for the production or improvement of materials in a variety of ways. HIP is frequently used to eliminate porosity from a material thereby producing a fully dense material with improved properties. HIP is also used to bond together dissimilar materials which are not otherwise conveniently joined into a single, integrated part. Also, HIP is commonly used to compress powders into a fully dense, solid part.

We will use the term "workpiece" to denote any material, or combination of materials, to be HIP processed. As noted above, such workpieces could be a single solid material requiring densification, dissimilar materials to be bonded together, or powders requiring compaction. In the case of powders, the powders may be held in the desired final shape during HIP processing by an appropriate mold, by preliminary mechanical pressing, by the use of binding agents, or by several other techniques and combinations of techniques well known in the field. For economy of language, "workpiece" as used herein will encompass any such starting material for HIP.

Conventional HIP is commonly characterized as a "creep" process. Pressure is applied to force into tight union the various surfaces to be bonded. Heat is applied to increase the molecular motion of the proximate surfaces, leading to diffusion of one surface into another. This mass diffusion resulting from molecular inter-penetration of surfaces held together by pressure leads to fully dense, fully chemical bonded materials typical of HIP processing. Typically, conventional HIP processing requires hours at elevated temperature and pressure for adequate mass diffusion and densification to occur; that is, for the surfaces to "creep" together.

A significant drawback to conventional HIP processing is the length of time (typically hours) the workpiece must spend at elevated temperatures and pressures. Thus, workpieces typically must occupy the HIP press for many hours, reducing throughput and increasing processing costs per part. The typical response to this economic drawback of conventional HIP has been to limit HIP to expensive parts in which HIP processing costs are tolerable. Thus, the beneficial properties in workpieces created by HIP processing are not commercially available for many workpieces. An alternative response to long processing times for conventional HIP has been to process parts in large quantities in a large HIP press. This suffers from the twin disadvantages of requiring even more massive (and, hence, expensive) equipment, and requiring an accumulation of workpieces before HIP processing will commence (running counter to the overriding modern thrust for "just-in-time" processes to minimize inventory and work-in-progress manufacturing costs).

Many approaches have been taken to reducing the time of HIP processing and, hopefully, reducing thereby the processing cost per workpiece. Previous work of ours (U.S. Pat. No. 4,856,311) is one approach to increasing the speed of HIP processing. A container holding workpieces is rapidly pressurized with gas to achieve HIP processing results in a much reduced period of time. This approach markedly reduces the time each workpiece resides in the pressure vessel. In this approach the workpieces may typically be preheated prior to introduction into the HIP press, further minimizing the residence time in the pressure vessel.

Another approach to rapid processing is "explosive forming". Explosive forming is descriptively named in that workpieces are forced together by an "implosion" of the workpiece caused by a surrounding "explosion" of a conventional chemical explosive. The resulting process involves both high pressures from the explosion and high temperatures formed by the energy of the explosion, as released directly and generated within the workpiece by friction between surfaces rapidly compressed together. Explosive forming is not suited for many workpieces due to the extreme conditions typically generated during the explosive processing, and the difficulty in controlling the process parameters of time, temperature and pressure.

In contrast to conventional HIP processing, conventional forging can typically shape and densify materials very rapidly. Typical forging processes use a workpiece placed into a suitable mold or chamber and heated. While held in place by mechanical reaction forces generated by the mold, high pressures are applied to the workpiece, typically by a mechanical force or ram (or, in some cases, by a blacksmith's hammer). Such forces are not truly isostatic and have significant directional components, generating nonuniform pressures along different directions of the workpiece. Many researchers have recognized the disadvantages of this non-isostatic application of forces and have attempted to mitigate the application of mechanical ram forces in a variety of ways. Several researchers have used various low-yield strength solids (typically powders) surrounding the workpiece in an attempt to distribute the force of the mechanical ram more evenly about the workpiece (i.e. U.S. Pat. Nos. 3,356,496; 4,389,362; 4,431,605; 4,539,175). The work of Inoue (U.S. Pat. No. 4,414,028) uses six separately controlled mechanical rams in addition to a solid surrounding pressure transmitting medium as an approach to achieving more isostatic pressure application to the workpiece.

All of these "pseudo-isostatic" processes suffer from one or more disadvantages. Shearing forces of the pressure transmitting medium do not allow uniform pressure to be applied to the workpiece, resulting in possible workpiece distortion. The pressure transmitting medium may not flow adequately around workpieces with complex shapes, leading to shape-dependent processing. The pressure transmitting medium itself may be damaged by the high process temperatures and pressures. The process of removal of the pressure transmitting medium, detaching it adequately from the workpiece, and reprocessing it for reuse (sometimes with heating of the medium as in U.S. Pat. No. 4,539,175 or its commercial tradename process "Ceracon") are additional processing steps.

Rapid HIP processing can be achieved by generating pressures, not with mechanical rams, but by thermal expansion of gases (U.S. Pat. No. 4,856,311; 4,942,750 and Robert M. Conaway, "Cost-Effective Isostatic Forging" in *Advanced Materials and Processes*, June 1989). These processes employ encapsulation of a workpiece in a suitable container (if required), typically followed by heating of the workpiece outside the pressure-containment vessel, introduction of the workpiece into the pressure-containment vessel and rapid application of pressure achieved through thermal expansion of gases. The resulting apparatus and process achieve both genuine isostatic processing of HIP and a significant reduction in processing time in comparison with conventional HIP. "Fast-HIP", "Quick-HIP" or "gas forging" are shorthand terms which have been used to denote this improvement on conventional HIP processing of workpieces, using thermal expansion of gases to generate elevated pressures: "fast-HIP" emphasizing the achievement of fast processing times without sacrificing the advantages of HIP, while "gas forging" emphasizes the use of gas to replace the mechanical ram of conventional forging processes. Gas forging succeeds in reducing the time a workpiece occupies the pressure chamber, thereby increasing throughput for expensive pressure processing equipment. In addition, the use of gas as the pressure transmitting medium eliminates the problems noted above with shearing forces in the pressure transmitting medium; with difficulties of completely surrounding workpieces having complex shapes; with possible damage to a solid pressure transmitting medium during processing; and with the reprocessing (and reheating) of the solid pressure transmitting medium for reuse.

Previous HIP and forging processes are typically carried out with the heating of the workpiece prior to (or simultaneously with) the application of pressure. This is the case in conventional forging in which a mechanical ram typically impacts a hot workpiece, and in the pseudoisostatic forging processes noted above. Such heating prior to application of pressure is also the case in fast-HIP, as described in the cited patents, in which heating of the workpiece occurs typically outside the pressure-containment vessel.

However, elevated temperatures can have serious detrimental effects on many workpieces. Typically, four general classes of problems occur when elevated temperatures are employed: 1) In two-phase systems (typically, fiber-containing or composite materials), high temperatures may reduce the strength of the bonding between phases, thereby reducing the overall strength of the material. 2) Certain materials are metastable and, in spite of this, very useful in many applications. (Rapidly solidified materials are an example). The metastability of such materials is often destroyed by lengthy exposures to elevated temperatures, causing the material to revert to its thermodynamically stable (and less useful) form. 3) Elevated temperatures can cause structural changes in the atomic or molecular configuration of the material, affecting thereby its properties. Typically, exposure to elevated temperature can lead to the growth of a larger grain structure within the material, detrimentally affecting the properties of the material. 4) Elevated temperatures may cause chemical reactions to occur, or decomposition of component molecules, changing thereby the chemical composition (stoichiometry) of the workpiece.

The present invention describes a method in which the time required for the workpiece to be at elevated temperatures is reduced, sometimes dramatically, while retaining the advantages of HIP processing. The elimination of deleterious effects of high temperatures leads to novel processing possibilities, and can result in novel materials not heretofore produced by other processes. The present approach should be contrasted (for example) with that of Lueth (U.S. Pat. No. 4,431,605) in which temperatures of the workpiece at or near the liquid phase temperature are used for the purpose of reducing the pressure required for HIP processing. It is an important goal of the present invention to show the advantages of minimizing, not the processing pressure, but the application of high processing temperatures to the workpiece.

SUMMARY AND OBJECTS OF INVENTION

The present invention relates to a process for the compaction of materials using heat and high pressure in which pressure is first applied to the workpiece to be compacted, heat is applied to the pressurized workpiece as rapidly as feasible, effecting thereby full compaction and densification. Heating is terminated and the workpiece cooled as rapidly as feasible while the workpiece is still pressurized. This process effects HIP processing of workpieces while minimizing the time such workpieces spend under elevated temperatures. The resulting material comprising the workpiece can have novel structures, properties or compositions not obtained with other processing procedures.

The basic object of this invention is to process a workpiece with heat and pressure while reducing the time the part must spend at elevated temperatures.

Another object of the present invention is to reduce the heat-induced changes in grain structure caused by conventional HIP processing.

Yet another objective of the present invention is to reduce the heat-induced chemical changes induced in the chemical composition of the workpieces by conventional HIP processing.

Another object of the present invention is to reduce the degradation of composite, fiber-reinforced or other multiphase materials caused by conventional HIP processing.

Yet another object of the present invention is to reduce the degradation of metastable phases caused by conventional HIP processing.

Yet another object of the present invention is to produce novel materials having novel properties.

Another object of the present invention is to produce novel materials having novel properties by producing such materials with markedly reduced time at elevated temperatures, allowing thereby structures and compositions to survive HIP processing, resulting in novel, HIP processed, materials.

DESCRIPTION OF PREFERRED EMBODIMENTS

Figure 1:
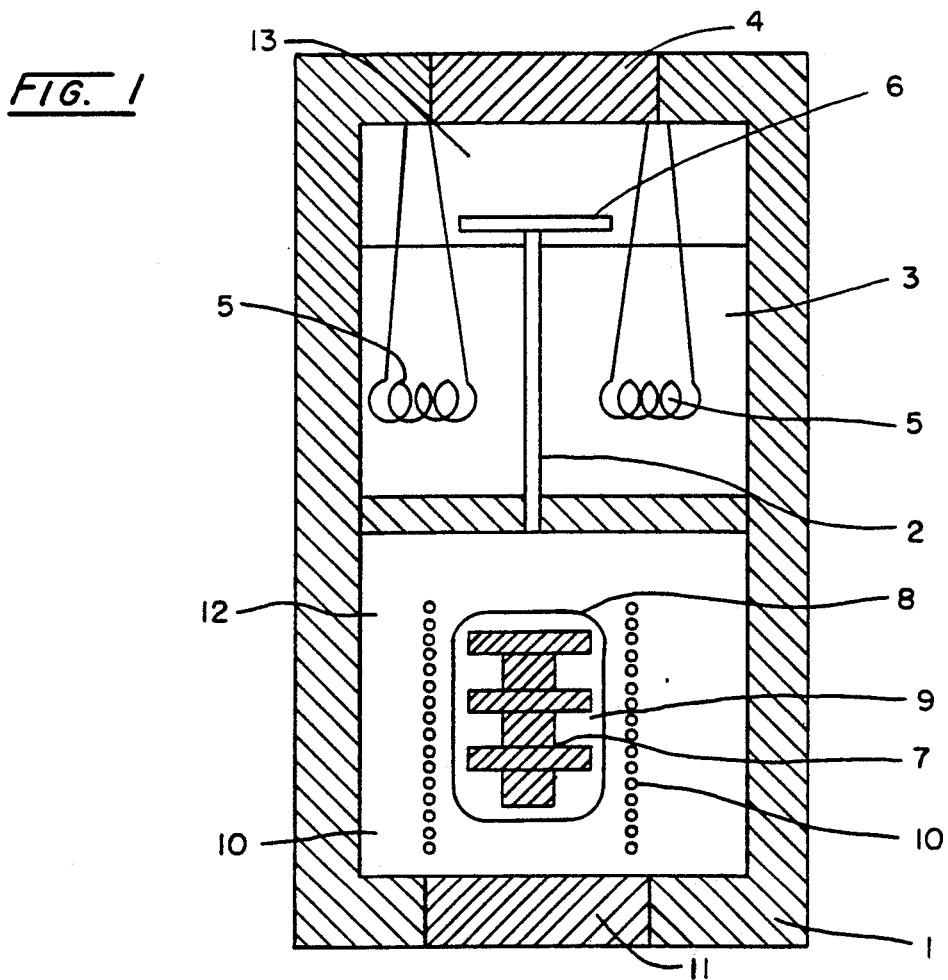
FIG. 1: Schematic cut-away of typical apparatus used for gas forging, and well-suited for the practice of the process of the present invention.

FIG. 1 shows in schematic, cut-away view a gas forging apparatus of the type previously described (i.e. U.S. Pat. No. 4,856,311). This apparatus is particularly convenient for the practice of the present invention because, unlike equipment conventionally used for HIP processing, the pressurizing step and heating step and be independently controlled. Typical HIP equipment performs initial pressurizing, often simultaneously with initial heating of the workpieces. As heat is applied to bring the workpieces to the desired operating temperature, gas pressure in the HIP pressure vessel inevitably rises via Charles' Law. The equipment of FIG. 1 has separately controlled heaters for workpieces and pressurizing gas, allowing pressure and temperature to be controlled in a completely decoupled manner.

A thermally-insulating pressure-containment vessel, 1, typically comprises two chambers, 12 and 13 connected by a suitable tube, 2. A cryogenic fluid, 3, is placed into the first chamber, 13 of the pressure vessel, 1, through a pressure-containing plug, 4. This fluid, 3 is typically argon for the applications of the present invention described herein. Helium, nitrogen oxygen as well as other fluids are also feasible in particular processing applications. Typically, electrical heating elements, 5, are immersed in the cryogenic fluid, 3, allowing controlled heating of fluid, 3. Rapid heating of the fluid, 3, leads to rapid in creases in pressure inside chamber 13.

Tube 2 is typically attached to a valve which automatically opens at a predetermined pressure. A simple pressure-rupturing membrane is shown as cap, 6. This cap allows the pressure in the upper chamber, 13, to increase to a certain critical value at which pressure the cap ruptures (or, alternatively, the pressure-opening valve will open). However, the use of this cap, 6, is not essential if the particular process is not affected should the pressure in both chambers, 12 and 13 increase in unison and at approximately the same rate (as would be the case if cap, 6, is dispensed with entirely).

The second chamber, 12, of pressure vessel 1 contains workpieces to be processed, 7. Such workpieces are typically encased in a suitable "can", 8 containing media, 9 for applying pressure reasonably uniformly to all workpieces, 7. It is possible in certain applications to dispense with the use of media, 9 in favor of a "conformal can". It is also possible for certain workpieces, 7, to dispense with both can, 8, and media, 9.

Also shown in FIG. 1 are separate heating elements, 10, (typically electrical) configured so as to allow uniform and controlled heating of all workpieces, 7. Other methods of heating workpieces, well known in the field, include electrical induction heating, microwave heating, or heating by lasers. The detailed use of such alternate heating procedures are conventional and will not be described in detail here. Access to heating elements 10 and the can, 8, containing the workpieces is typically accomplished by means of a pressure-containing, removable plug, 11.

This gas forging apparatus allows a very convenient approach to the practice of the process of the present invention. The general idea of the present invention is to apply heat to workpieces, 7 for a time no longer than necessary to fully compact and densify the workpieces. Thus, by use of controlled amounts of electrical power to heaters, 5, the pressure in chambers 12 and 13 can be raised to the desired value, while keeping workpieces 7 at approximately ambient temperature. Then, rapid heating of electrical heaters 10 is carried out until the workpieces, 7, reach the desired compaction and density.

Figure 2:
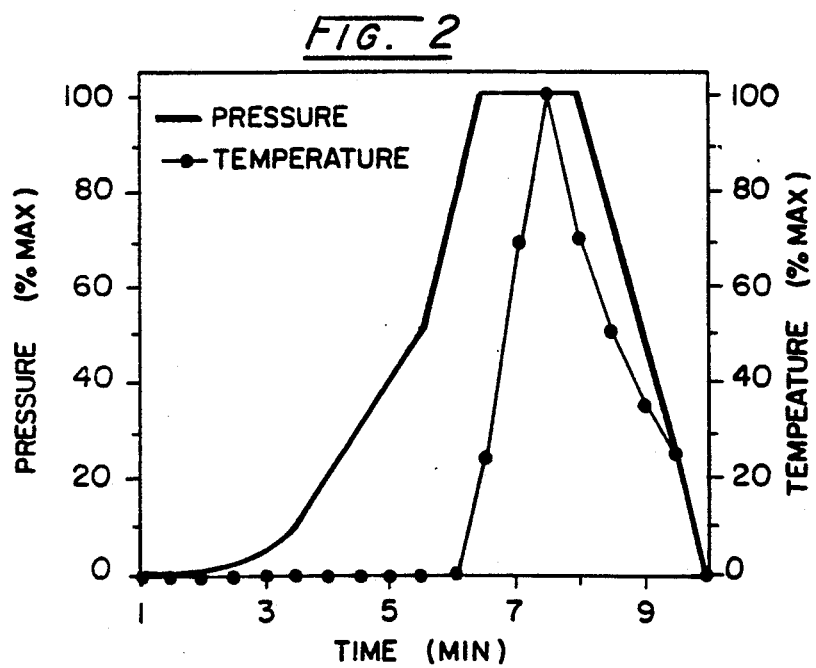
FIG. 2: Typical processing profile of pressure and temperature vs time following the process of the present invention.

FIG. 2 shows a typical process as would be performed by the present invention. The workpieces, 7, are inserted into can, 8, (if required) and placed into pressure vessel, 1. The upper chamber, 13, is charged with suitable fluid, 3. Heaters 5 are inserted into the fluid and all pressure seals are secured. The heaters, 5 are activated, leading to a rise in pressure in chambers 12 and (following opening of valve or rupture membrane, 6), 13. When the pressure has reached its desired maximum value, the workpiece heaters, 10 are activated. The temperature of the workpieces is raised to the desired value as quickly as feasible consistent with the heating capacity of the system, including thermal conductivity of the can, 8, media, 9 and intervening spaces. Typically, the maximum temperature would be 60% to 80% of the melting temperature of the material comprising the workpiece. In the case of a workpiece consisting of several materials, the maximum temperature would typically be in the range of 60% to 80% of the melting temperature of the component material having the lowest melting temperature.

Typically, the maximum pressure would be in the range of 4 to 6 times the flow stress (or "short term yield strength") of the material comprising the workpieces. In the case that the workpieces comprise materials having different flow stresses, the maximum pressure will typically be chosen to be 4 to 6 times the flow stress of the component material having the smallest value of flow stress.

A major goal of the present invention is to minimize the time the workpieces spent at their maximum temperatures. Thus, the heating and cooling of the workpieces will be carried out as quickly as the equipment will practically allow. This leads to typical pressure, temperature profiles for this process as illustrated in FIG. 2. As noted above, the maximum temperature desired will vary depending on the particular workpiece material to be processed. Aluminum-based materials typically require heating to approximately 500 deg. C., while 800-1100 deg. C. is typical for iron-based materials.

Figure 3:
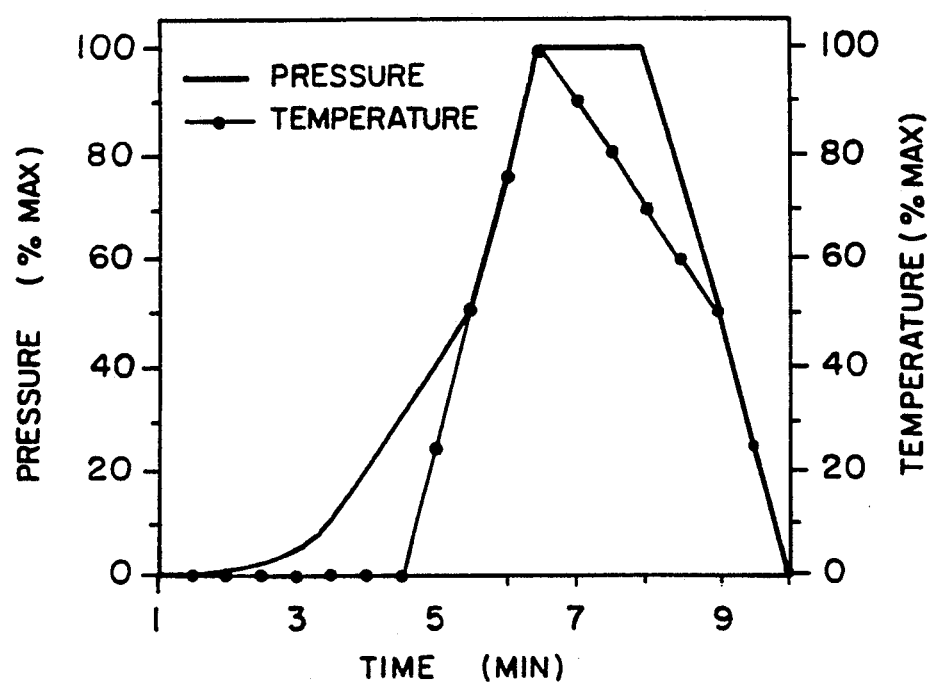
FIG. 3: Alternative processing profile of pressure and temperature vs time following the process of the present invention.

An alternative embodiment is shown by the pressure, temperature profiles of FIG. 3. For this process, the pressure-generating heaters, 5 are engaged to raise the pressure in chambers 12 and 13. As pressurizing gas surrounds can 8 in chamber 12, the thermal convectivity of the region from heaters 5 to can 8 will typically increase. When this thermal convectivity has reached a convenient value, the heating of workpieces, 7 is commenced by the activation of heaters, 10. Typically, this means that heaters, 10 will be activated before the pressure in chamber 12 has attained its maximum value, as illustrated in FIG. 3. As shown in FIG. 3, the pressure and temperature increase at the same time (but not necessarily at the same rate), until maximum pressure and temperature are attained. In practice, the maximum temperature and pressure will be attained almost simultaneously, as illustrated in FIG. 3. An important goal of the present invention is to minimize the time workpieces spend at their maximum processing temperatures. Therefore, maximum temperatures may be attained after maximum pressure (thereby becoming rather like the process of FIG. 2). Typically, the pressure and temperature will reach maximum values at approximately the same time, as shown in FIG. 3.

The fundamental goal of the present invention is to minimize the time the workpieces spend at high temperatures. Typically, high temperatures can have negative consequences for the properties of many workpieces. Higher temperatures can lead to grain growth. Therefore, to attain smaller grain sizes, it is helpful to process at high temperatures for a short a time as practicable. For metastable materials, elevated temperatures frequently cause the structure of such materials to revert to their thermodynamically stable forms, destroying thereby the advantageous properties accompanying the metastable phase. Composite or fiber-reinforced materials may not be completely compatible at elevated temperatures, leading to degradation of the properties or, in severe cases, debinding of the different phases. Also, prolonged exposure to elevated temperatures can cause stoichiometric changes in the material.

Increasing interest is being directed at the superior performance possible with single crystal or directionally solidified materials for such applications as turbine blades, and other high-performance components. The HIP process of the present invention, minimizing the time such materials must spend at high temperature, offers the possiblity of removing residual porosity from such materials while avoiding major atomic reconfigurations and destruction of the desired crystal structure.

Figure 4:
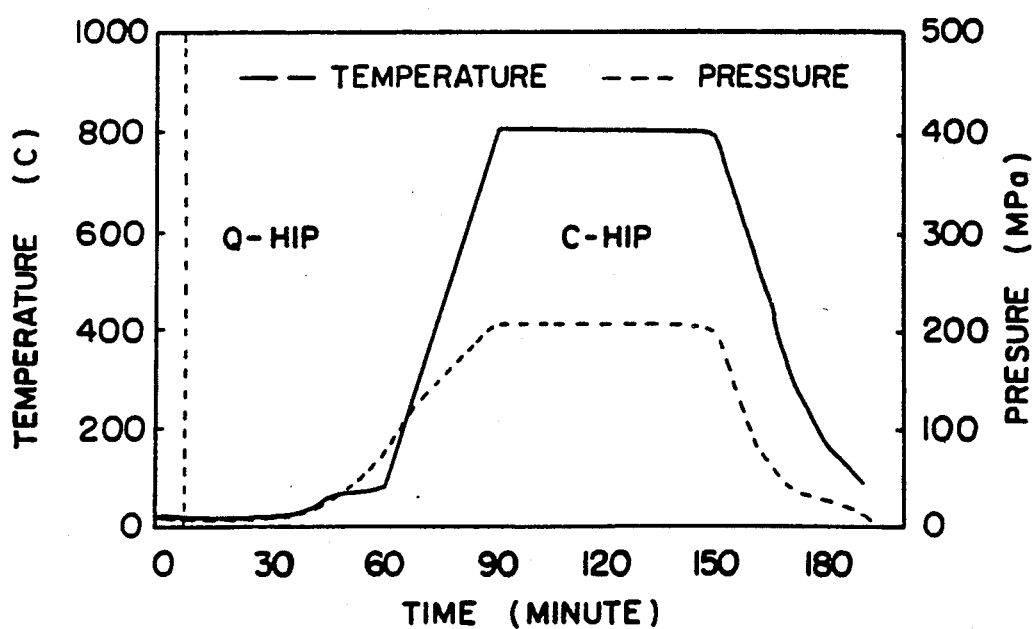
FIG. 4. Temperature, Pressure vs Time profiles for the rapid densification of the present invention, "Quick-HIP" compared to processing with conventional Hip "C-HIP". This is from the publication of Lin and German.

An experimental comparison of the process of the present invention with other HIP processes has been carried out by S. T. Lin and R. M. German "Mechanical Properties of Fully Densified Injection-Molded Carbonyl Iron Powder", *Metallurgical Transactions A,*, Volume 21A, p.2531-2538, September 1990). This work demonstrated that a reduction of the time at temperature in HIP processing markedly improved the properties of powder injection molded particles of iron carbonyl. FIG. 4 is reproduced from this publication (their FIG. 3) in which the experimental conditions of the present invention are shown as "Q-HIP". Table I shows a summary of the results of the present invention (their published Table VII) comparing various properties of the present invention "Q-HIP" with conventional HIP processing, "C-HIP", and a variety of other densification methods. (The detailed experimental procedures are described in the cited publication and are incorporated herein by reference thereto.) The improved properties resulting from the practice of the present invention are clearly evident.

It is important to emphasis the differences of the present invention with our previous descriptions of "Quick-HIP". Our previous approach was directed at ways to minimize the time workpieces are resident inside the pressure chamber and held at high pressures. It was felt that favorable costs and high throughput of workpieces could be achieved by making maximum use of the (relatively expensive) pressure vessel and pressurizing equipment. Our previous patents are directed to equipment and methods to accomplish this goal. It was envisioned in this prior work that high throughput could best be obtained by performing much of the required heating and cooling outside the pressure vessel in the manner typical of forging or pseudo-isostatic forging. While this external heating would increase the throughput of the HIP press, it would not minimize the time the workpieces spend at elevated temperatures.

The present invention, in contrast, is directed not at getting the workpiece into and out of the HIP pressure vessel as quickly as possible. The present invention is directed at a different goal of minimizing the time the workpiece spends at elevated temperature in order to achieve (or maintain) superior properties. This goal often is in direct conflict of making maximum use of the HIP press. However, the equipment previously described and patented is very well suited for the practice of this process also. In particular, the independent and decoupled heating elements make it quite convenient to control pressure and workpiece temperature quite independently. This flexible use of previously described equipment led to the processing methods of the present invention.

TABLE 1

Properties of powder injection molded iron carbonyl densified by various methods (from S. T. Lin and R. M. German "Mechanical Properties of Fully Densified Injection-Molded Carbonyl Iron Powder", Metallurgical Transactions A, Volume 21A. p. 2531-2538, September 1990).

| | Density (g/cm$^3$) (Pct Theoretical) | Ultimate Tensile Strength (MPa) | | Reduction of Area (Pct) | | Hardness (HRB) | |
|---|---|---|---|---|---|---|---|
| | | Average | Standard Dev. | Average | Standard Dev. | Average | Standard Dev. |
| H1300 | 7.59(96.4) | 406 | 72 | 18.2 | 3.4 | 58.5 | 0.9 |
| V1300 | 7.57(96.2) | 498 | 84 | 5.4 | 2.6 | 85.1 | 0.8 |
| V1200 | 7.30(92.6) | 261 | 7 | 2.4 | 2.3 | 48.5 | 1.6 |
| C-HIP | 7.78(98.9) | 385 | 17 | 39.0 | 3.9 | 90.2(top) 56.1(bot.) | 0.3(top) 3.8(bot.) |
| Q-HIP | 7.83(99.5) | 732 | 7 | 23.4 | 0.9 | 91.8 | 1.1 |

I claim:

1. A method for the processing of a workpiece with high temperature and high pressure comprising the steps:

a) placing said workpiece into a pressure-containment vessel, and, b) applying pressure to said workpiece of at least 10,000 pounds per square inch, and, c) applying heat to said workpiece by a heating means, raising thereby the temperature of said workpiece such that every region of said workpiece requiring processing reaches a temperature in the range from a minimum of 60% to a maximum of the melting temperature of said material comprising said workpiece, wherein said heating is performed as rapidly as practicable consistent with the capabilities of said heating means, and, d) applying pressure to said workpiece, said pressure reaching a maximum value at least four times the flow stress of the material comprising said workpiece, wherein said flow stress is determined for the material of said workpiece at the maximum processing temperature attained in step (c), and, e) lowering the temperature of said workpiece to a value causing further processing of said workpiece to cease, and, f) releasing said pressure and removing said workpiece from said pressure-containment vessel.

2. A method as in claim 1 wherein said heating means comprises induction, microwave or laser heating of said workpieces.

3. A method as in claim 1 wherein said heating step (c) and said pressurizing step (d) are performed concurrently.

4. A method as in claim 1 wherein said workpiece comprises at least two dissimilar materials, and wherein said temperature of step (c) is at least 60% of the melting temperature of the lowest melting of said dissimilar materials, and wherein said flow stress of step (d) is the smallest flow stress of said dissimilar materials.

5. A method as in claim 1 wherein said workpiece comprises a single crystal workpiece.

6. A method as in claim 1 wherein said workpiece comprises a directionally solidified workpiece.

* * * * *

UNITED STATES PATENT AND TRADEMARK OFFICE
CERTIFICATE OF CORRECTION

PATENT NO. : 5,110,542
DATED : May 5, 1992
INVENTOR(S) : Robert M. Conaway

It is certified that error appears in the above-indentified patent and that said Letters Patent is hereby corrected as shown below:

```
Column 5, line 14, delete "and" (2nd occurrence) and replace with --can--.
Column 5, line 30: insert a comma "," following the word "nitrogen".
Column 5, line 35: cancel the words "in creases" and replace with "increases".
Column 6, line 16: cancel the number "12" and replace with "13".
Column 6, line 18: cancel the number "13" and replace with "12".
Column 6, line 40: cancel "spent" and replace with "spend".
Column 8, line 26: insert immediately following the word "conflict", the words
                   "with that of".
```

Signed and Sealed this

Third Day of August, 1993

Attest:

MICHAEL K. KIRK

Attesting Officer

Acting Commissioner of Patents and Trademarks